US011570308B2

(12) United States Patent
Albino et al.

(10) Patent No.: US 11,570,308 B2
(45) Date of Patent: *Jan. 31, 2023

(54) METHODS, SYSTEMS, ARTICLES OF MANUFACTURE AND APPARATUS TO CALIBRATE PAYLOAD INFORMATION

(71) Applicant: The Nielsen Company (US), LLC, New York, NY (US)

(72) Inventors: Austin W. Albino, San Francisco, CA (US); Jana Dodson, New York, NY (US); Chao Wang, New York, NY (US); Sarah Macdonald, New York, NY (US); Alexander Fragapane, Daly City, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,035

(22) Filed: Jul. 29, 2021

(65) Prior Publication Data

US 2022/0012661 A1    Jan. 13, 2022

Related U.S. Application Data

(63) Continuation of application No. 15/966,991, filed on Apr. 30, 2018, now Pat. No. 11,120,377.
(Continued)

(51) Int. Cl.
*H04M 3/22* (2006.01)
*H04M 15/00* (2006.01)
(Continued)

(52) U.S. Cl.
CPC ............ *H04M 15/58* (2013.01); *H04L 43/50* (2013.01); *H04L 67/535* (2022.05);
(Continued)

(58) Field of Classification Search
None
See application file for complete search history.

(56) References Cited

U.S. PATENT DOCUMENTS 6,625,648 B1    9/2003 Schwaller et al.
7,197,013 B2    3/2007 Douglas et al.
(Continued)

OTHER PUBLICATIONS

United States Patent and Trademark Office, "Non-Final Office Action," issued in connection with U.S. Appl. No. 15/966,991, dated Apr. 14, 2021, 4 pages.
(Continued)

*Primary Examiner* — Quoc D Tran
(74) *Attorney, Agent, or Firm* — Hanley, Flight & Zimmerman, LLC

(57) ABSTRACT

Methods, apparatus, systems, and articles of manufacture to calibrate payload information are disclosed. An example apparatus includes at least one memory, instructions in the apparatus, and processor circuitry. The processor circuitry is to execute the instructions to obtain (a) passive measurement data and (b) background active measurement (BAM) data from panelists in a market of interest, the BAM data associated with network usage metrics of panelist wireless devices undisturbed by panelist behavior. The processor circuitry is also to execute the instructions to assign a first share of the passive measurement data and a second share of the BAM data to particular areas within the market of interest, the first share based on a number of passive measurement occurrences in a first one of the particular areas, the second share based on a number of BAM occurrences in the first one of the particular areas. The processor circuitry is also to execute the instructions to remove a bias between the passive measurement data and the BAM data by calibrating the BAM data for the market of interest using
(Continued)

weights determined for the first one of the particular areas based on the first and second shares.

20 Claims, 7 Drawing Sheets

Related U.S. Application Data

(60) Provisional application No. 62/611,797, filed on Dec. 29, 2017.

(51) Int. Cl.
*H04L 43/50* (2022.01)
*H04L 67/50* (2022.01)
*G06Q 10/06* (2012.01)
*H04L 43/0876* (2022.01)
*H04M 1/72457* (2021.01)

(52) U.S. Cl.
CPC .... *H04M 3/2263* (2013.01); *G06Q 10/06315* (2013.01); *H04L 43/0876* (2013.01); *H04M 1/72457* (2021.01); *H04M 15/60* (2013.01); *H04M 15/8027* (2013.01); *H04M 2215/0184* (2013.01); *H04M 2215/7428* (2013.01)

(56) References Cited

U.S. PATENT DOCUMENTS

| | | |
|---|---|---|
| 7,392,017 B2 | 6/2008 | Chu et al. |
| 9,565,578 B2 | 2/2017 | Chu et al. |
| 11,120,377 B2 * | 9/2021 | Albino ................ H04L 43/0876 |
| 2007/0030815 A1 | 2/2007 | Beerends et al. |
| 2009/0029651 A1 | 1/2009 | Polini et al. |
| 2016/0112883 A1 | 4/2016 | Hassan et al. |
| 2016/0127921 A1 | 5/2016 | Bhatia et al. |
| 2016/0286409 A1 | 9/2016 | Kravets et al. |
| 2017/0086084 A1 | 3/2017 | Jarvis |
| 2018/0206136 A1 | 7/2018 | Chow et al. |

OTHER PUBLICATIONS

United States Patent and Trademark Office, "Notice of Allowance and Fee(s) Due," issued in connection with U.S. Appl. No. 15/966,991, dated Jun. 17, 2021, 8 pages.

* cited by examiner

600

| MARKET | METRIC | VALUE | | MARGIN OF ERROR (MOE) | | RANK | |
|---|---|---|---|---|---|---|---|
| | | PROVIDER 1 | PROVIDER 2 | PROVIDER 1 | PROVIDER 2 | PROVIDER 1 | PROVIDER 2 |
| CHICAGO | PERCENT OF TESTS WITH NO REBUFFERING | 72.6% | 86% | 3.2% | 3.0% | 1 | 4 |
| CHICAGO | PERCENT OF TIME REBUFFERING | 2.9% | 3.1% | 1.2% | 1.1% | 1 | 1 |
| CHICAGO | PERCENT OF TIME IN HD | 63.3% | 55.3% | 3.7% | 3.3% | 2 | 3 |
| CHICAGO | AVERAGE REBUFFERS PER TEST | 0.33 | 0.39 | 0.04 | 0.04 | 1 | 1 |
| CHICAGO | AVERAGE VIDEO START TIME (S) | 5.05 | 4.93 | 0.27 | 0.16 | 2 | 2 |
| CHICAGO | VIDEO START SUCCESS RATE | 98.4% | 98.0% | 1.0% | 0.9% | 1 | 1 |

| MARKET | METRIC | VALUE | | MARGIN OF ERROR (MOE) | | RANK | |
|---|---|---|---|---|---|---|---|
| | | PROVIDER 1 | PROVIDER 2 | PROVIDER 1 | PROVIDER 2 | PROVIDER 1 | PROVIDER 2 |
| CHICAGO | PERCENT OF TESTS WITH NO REBUFFERING | 74.0% | 64.6% | 3.9% | 3.8% | 1 | 4 |
| CHICAGO | PERCENT OF TIME REBUFFERING | 4.0% | 3.0% | 1.7% | 1.3% | 1 | 1 |
| CHICAGO | PERCENT OF TIME IN HD | 62.4% | 57.0% | 4.5% | 4.3% | 2 | 2 |
| CHICAGO | AVERAGE REBUFFERS PER TEST | 0.31 | 0.40 | 0.05 | 0.05 | 1 | 3 |
| CHICAGO | AVERAGE VIDEO START TIME (S) | 5.32 | 4.86 | 0.37 | 0.20 | 2 | 2 |
| CHICAGO | VIDEO START SUCCESS RATE | 97.7% | 98.2% | 1.4% | 1.0% | 2 | 2 |

FIG. 6

METHODS, SYSTEMS, ARTICLES OF MANUFACTURE AND APPARATUS TO CALIBRATE PAYLOAD INFORMATION

RELATED APPLICATIONS

This application arises from a continuation of U.S. patent application Ser. No. 15/966,991, filed Apr. 30, 2018, which claims priority to U.S. Provisional Patent Application No. 62/611,797, filed Dec. 29, 2017. The entireties of U.S. patent application Ser. No. 15/966,991 and U.S. Provisional Patent Application No. 62/611,797 are incorporated by reference herein.

FIELD OF THE DISCLOSURE

This disclosure relates generally to wireless network performance, and, more particularly, to methods, systems, articles of manufacture, and apparatus to calibrate payload information.

BACKGROUND

In recent years, wireless network providers have invested capital into infrastructure improvements to satisfy consumers of wireless services. Wireless network providers seek information related to which portions or locations of their infrastructure are candidates for capital investment, thereby avoiding improvements to portions or locations that may not be necessary. Wireless network providers also wish to compare the performance of their wireless network to competing providers. For example, wireless network providers seek to determine locations in which they are ahead of competitors and in which locations they lag behind their competitors. For these reasons, it is important for wireless network providers to accurately measure performance throughout different areas and markets.

BRIEF DESCRIPTION OF THE DRAWINGS

FIG. 6 is an example set of scorecards 600 created based on the calibrated BAM data generated by the data calibrator 201 of FIG. 2.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1A:
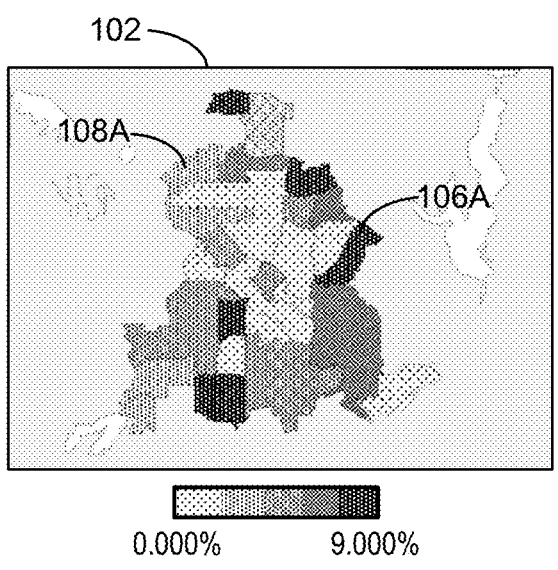
FIG. 1A is a map illustrating example passively collected data usage for a market of interest.

Performance of a wireless network may fluctuate based on several different infrastructure-related influences, such as network element age, network element technologies, network element broadcast power, base station(s) antenna configuration(s), base station(s) antenna technologies, etc. Additionally, the performance of a wireless network may fluctuate based on several operating characteristics, such as weather conditions, number of active users of the network, distribution of the active users at different portions of the network, and/or other operating characteristics.

To determine whether one or more markets or locations of the wireless network are candidate locations for infrastructure capital investment, network testing is performed. Two example methods of the technical field of network testing are employed: passive measurement testing and background active measurement (BAM) testing. Passive measurement testing includes measurements of how consumers actually experience and use their wireless network on a day-to-day basis. BAM testing includes measuring wireless network capability through controlled, regularly scheduled testing.

However, in the technical field of network testing and market research, to isolate issues with one or more markets or locations of the wireless network that may be performing above or below one or more threshold criteria (e.g., bit-error-rate threshold values, transmission bandwidth threshold values, receiver bandwidth threshold values, power level threshold values, etc.), variability during the testing must be reduced and/or minimized. For example, in the event that a bandwidth test is performed by one or more on-device-meters (ODMs) during a time at which network demand is relatively high, the results of the bandwidth test may be influenced by factors not associated with infrastructure-related influences. In other words, a relatively poor result of the bandwidth test may be caused by the relatively high network demand coincident with the test, thereby incorrectly indicating that one or more network elements of the test-area of interest are faulty.

To remove, reduce, and/or minimize network testing uncertainty, examples disclosed herein apply the BAM tests that occur during regularly scheduled dates and/or times. In some examples, BAM tests occur once every ten (10) days. The BAM tests include, for example, transferring a 60-second video from a test management server to a participating panelist wireless device. During the example BAM test, a corresponding ODM on the participating panelist wireless device measures an amount of time required to download the 60-second video, an amount of time before the 60-second video begins rendering of the transmitted video content, a number of video playback stall instances, and/or other measurable characteristics. In some examples, video playback stall instances are indicative of network connectivity problems, bandwidth management problems, and/or transmitter power problems. Such problems are related to the infrastructure of the wireless network in an area and are therefore important to wireless network providers engaged in the technical field of market research and network testing.

Additionally, examples disclosed herein ensure that user activities on the participating panelist wireless device do not influence test results from one or more BAM tests by confirming that the participating panelist wireless device meets specific criteria prior to initiating the BAM test(s). In other words, BAM testing is associated with network usage metrics of panelist wireless devices that are undisturbed by panelist behavior. For example, when the user is using the wireless device for one or more other functions (e.g., video viewing, picture viewing, web browsing, conducting a phone call, taking pictures, playing music, etc.), such other functions performed and/or otherwise executed by the wireless device may affect measurements related to the amount of time before the video begins rendering, the amount of time to download the video, the number of video playback stall instances, and/or other such measurable characteristics (e.g., due to the other functions consuming processing resources of the wireless device). Additionally or alternatively, the BAM test requires that the wireless device screen is off, the wireless device has not been turned on in the prior 5-minutes, and/or the wireless device has not moved (e.g., by monitoring on-device motion sensors, accelerometers, etc.) in the prior 5-minutes. In some examples, the BAM test occurs during a time of day in which it is less likely that user activities will occur on the wireless device, such as hours of the day in which sleeping typically occurs.

While the aforementioned requirements before and/or during BAM test procedures allows a greater degree of measurement accuracy that is related to infrastructure-related circumstances and less influenced by operating characteristics (e.g., user interaction), such requirements cause biasing of collected data. Stated differently, because BAM testing is triggered at regular intervals rather than at instances when a panelist is actually using their wireless device and/or the wireless network, BAM test results do not necessarily reflect real network activity in a given market of interest. Accordingly, examples disclosed herein improve the technical field of network testing and market research by weighting the BAM test results in a manner that is associated with the passively collected data usage, thereby reducing measurement error and/or otherwise improving the accuracy of measuring network activity within a given market or location.

In examples disclosed herein, a market of interest is selected that includes panelists within a same geographic area. As used herein, the term "market of interest" is a geographic area. In some examples, the market of interest is a metropolitan area of a major city (e.g., Los Angeles, Chicago, New York, etc.). In some examples, the market of interest may be one of the top 44 markets in the United States (e.g., the top 44 markets including the greatest number of panelists). Passive measurement data associated with panelist network usage metrics and background active measurement (BAM) data associated with network usage metrics of panelist wireless devices undisturbed by panelist behavior are obtained from panelists. A share of the passive measurement data and a share of the BAM data are assigned to particular areas within the market of interest, and weights for each of the particular areas are determined based on the share of passive measurement data and the share of BAM data in each of the particular areas. The BAM data is then calculated for the market of interest using the weights.

In some examples disclosed herein, the particular areas are zip codes within the market of interest. In some examples, the share of passive data is determined based on a number of passive data events occurring in each particular area and the share of active data is determined based on a number of active data events occurring in each particular area.

Some examples disclosed herein include determining the share of passive data by calculating a mean and corresponding standard error of the number of passive data events within the particular areas of the market of interest and determining the share of passive data for each zip code based on a comparison between the number of passive data events occurring in the particular area and the mean of passive events for the market of interest. In some such examples, the share of passive data for the particular area is the mean of the passive data events when the number of passive data events occurring in a particular area is within a first threshold value above or below the mean. In some other examples, the particular areas that include a number of passive data events within a second threshold value of zero are pooled together to determine a share of passive data for the pooled areas.

As used herein, the term "data event" refers to a transfer of data to or from a device (e.g., streaming audio/video, downloading app data (e.g., weather data, etc.), etc.) and is also referred to as a "measurement occurrence." As used herein, the term "passive data event" refers to any panelist activity on a device including a transfer of data to or from the device. Additionally, the term "active data event" as used herein refers to a transfer of a video (e.g., a video of a known duration, known frame rate, known file size, etc.) to a panelist device used for BAM testing. Further, as defined herein, a "passive share" refers to the number of passive data events occurring in a given particular area and is additionally referred to as a "share of passive data" and/or a "share of passive measurement data." As defined herein, an "active share" refers to the number of active data events occurring in a given particular area and is additionally referred to as a "share of BAM data."

FIG. 1A is a map 100 of passively collected data usage for an example market of interest (e.g., Dallas, Tex.). In some examples, the market of interest is a metropolitan area of a major city (e.g., Los Angeles, Chicago, New York, etc.). In some examples, the market of interest may be one of the top 44 markets in the United States (e.g., the top 44 markets including the greatest number of panelists). In the illustrated example of FIG. 1A, different shaded regions illustrate a usage percentage value of a wireless network that occurs during passive measurements. As used herein, "passive measurements" refer to ODMS on panelist devices to measure how consumers actually experience and use their wireless network on a day-to-day basis. For example, when a panelist watches a video on their mobile device, the ODM collects how much data is transferred to and from the device, a speed with which the data is transferred, which application(s) are used, current network technology, device type, etc. Stated differently, passive measurement data is indicative of network usage of wireless/mobile devices caused by panelist interaction(s) with their associated mobile devices. An example first region 106A of FIG. 1A indicates approximately 9% of a population is using the wireless network, while an example second region 108A indicates approximately 2% of a population is using the wireless network.

Figure 1B:
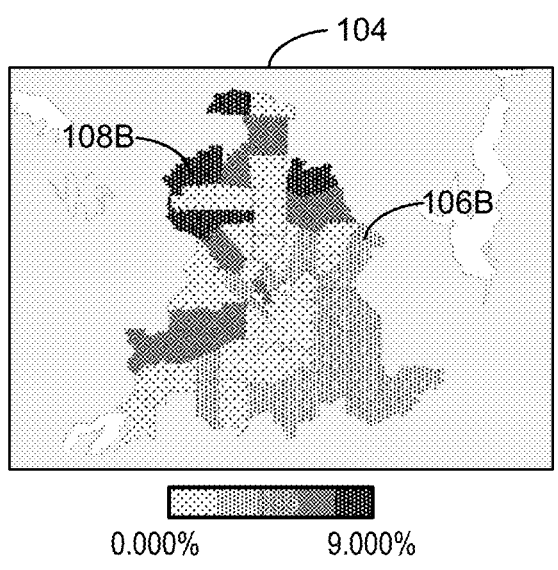
FIG. 1B is a map illustrating example background data usage for the market of interest shown in FIG. 1A.

FIG. 1B is a map 104 of BAM testing for the same example market of interest (e.g., Dallas, Tex.). In the illustrated example of FIG. 1B, different shaded regions (also referred to herein as a "particular area") illustrate a usage percentage value of a wireless network that occurs during BAM testing, as described above. An example first region 106B of FIG. 1B indicates a relatively lower population using the wireless network (approximately 1-2%) as compared to the example first region 106A of FIG. 1A, and an example second region 108B of FIG. 1B indicates a relatively higher population using the wireless network (approximately 8-9%) as compared to the example second region 108A of FIG. 1A.

The different usage patterns illustrated in FIGS. 1A and 1B identify a bias that occurs with BAM testing. For example, consider the example first region 106A and 106B of the market of interest is associated with a business district (e.g., a financial district, a manufacturing district, a business/office park, etc.) that is typically populated with workers during the day. Also consider the example second region 108A and 108B of the market of interest is associated with a residential area. With that, passive measurements illustrate a relatively higher usage of the wireless network in the business district (e.g., the first region 106A) in a manner consistent with expected usage patterns of users. However, the BAM test results associated with the example second region 108B of FIG. 1B indicate a relatively high amount of network usage for the residential area, but that indication is over-inflated due to the regularly scheduled test times (e.g., 2:00 AM when most users are likely sleeping). As such, examples disclosed herein weight BAM test results in a manner that adheres to expected usage patterns guided by the example passive measurement data.

Figure 2:
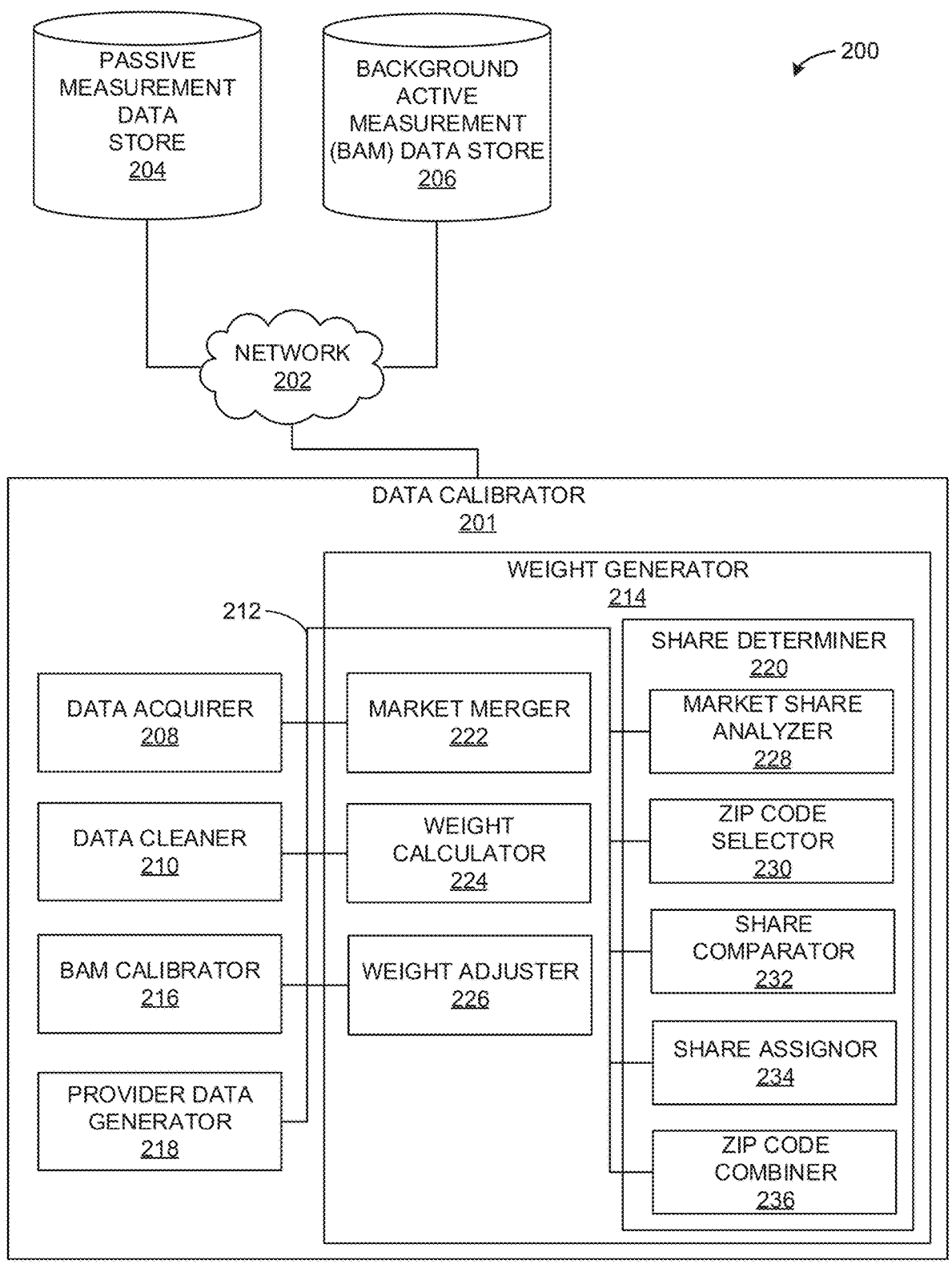
FIG. 2 is a schematic illustration of an example data calibration system constructed in accordance with the teachings of this disclosure to implement the examples disclosed herein.

FIG. 2 is a schematic illustration of an example data calibration system 200 constructed in accordance with the teachings of this disclosure to implement the examples disclosed herein. The example calibration system 200 includes an example data calibrator 201. The example data calibrator 201 of FIG. 2 removes bias inherent to background active measurement (BAM) data by applying weights based on passive measurement data (also referred to herein as "passive data"). The example data calibrator 201 of FIG. 2 is communicatively connected to an example network 202. The example network 202 of FIG. 2 may be the Internet, an intra-net, a wide-area network (WAN), or any other network. The example network 202 is communicatively connected to an example passive measurement data store 204 and an example background active measurement (BAM) data store 206. As described above, passive data stored in the example passive measurement data store 204 is acquired from ODMs operating and/or otherwise executing on panelist devices, such as wireless devices. In some examples, the passive measurement data is derived and/or otherwise acquired from the Nielsen® Mobile Performance (NMP)® platform, which uses a smartphone meter application (e.g., an ODM) to collect a stream of data on wireless network performance and/or consumer behavior from devices of approximately seventy thousand panelists across the United States. In some examples, the NMP® platform collects BAM data stored within the BAM data store 206.

In some examples, the BAM data stored within the BAM data store 206 may be acquired by any of the methods described above, but not limited thereto. The acquired BAM data stored in the BAM data store 206 may be biased due to the requirements of the data collection methods (e.g., the device screen must be off, the wireless device has not been turned on in the prior 5-minutes, the wireless device has not moved in the previous 5-minutes, etc.). To mitigate or eliminate the biases present in the BAM data, the data calibrator 201 of FIG. 2 applies a weighting factor or weight to the BAM data based on the passive data.

The example data calibrator 201 of FIG. 2 includes an example data acquirer 208. The example data acquirer 208 acquires the passive data from the example passive measurement data store 204 and the example BAM data from the example BAM data store 206 via the example network 202. In some examples, the data acquirer 208 may acquire the passive data and the BAM data at particular intervals of time (e.g., periodic, aperiodic, scheduled, etc.), in response to a request, and/or via any other method of data collection. In the illustrated example of FIG. 2, the data acquirer 208 selects a market of interest and acquires the passive data and the BAM data associated with the selected market of interest. In some examples, a user selects data for the data acquirer 208 to acquire. In some examples, the market of interest is a metropolitan area of a major city (e.g., Los Angeles, Chicago, New York, etc.). In some examples, the market of interest may be one of the top 44 markets in the United States (e.g., the top 44 markets including the greatest number of panelists). The data acquirer 208 further acquires passive data and BAM data associated with particular areas (e.g., region 106A of FIG. 1A) in the market of interest. The particular areas discussed herein are zip codes. However, other particular areas may also be included (e.g., cell tower radius locations, counties, etc.).

In the illustrated example of FIG. 2, the data calibrator 201 includes a data cleaner 210 to clean and filter the passive data and BAM data acquired by the data acquirer 208 for the selected market. In some examples, the data cleaner 210 receives the passive data and the BAM data from the data acquirer 208 via a bus 212. For example, the data cleaner 210 may discard any data events occurring prior to a specific time period (e.g., one month, one year, etc.). The data cleaner 210 may also ensure the data acquired includes at least a set number of panelists for each provider (e.g., at least two panelists for a given provider).

The example data calibrator 201 of FIG. 2 further includes an example weight generator 214 to calculate a weighting factor or weight to be applied to the BAM data. When the example weight generator 214 has calculated the weight, an example BAM calibrator 216 applies the weight to the BAM data acquired by the example data acquirer 208. The application of the weight eliminates or reduces the biases present in the BAM data, thus producing more accurate BAM data to be provided to cellular network providers.

The example data calibrator 201 of FIG. 2 further includes an example provider data generator 218 to generate data for use by a cellular network provider based on the calibrated BAM data. For example, the provider data generator 218 may receive the calibrated BAM data from the BAM calibrator 216 via the bus 212. The example provider data generator 218 calculates metrics indicating network performance within the market of interest for use by a provider. In some examples, the metrics include average video start time, video start success rate, and/or other metrics that may be desired by a network provider. In some examples, the metrics generated by the provider data generator 218 are displayed in a scorecard or other visual representation, such as the scorecard described in further detail in connection with FIG. 6.

The example weight generator 214 of FIG. 2 includes a share determiner 220 to determine a share of passive data to be assigned to each zip code within a market of interest. In other examples, a different particular area may be used in place of the zip code. The example weight generator 214 further includes an example market merger 222 to merge the passive data and the BAM data associated with the market of interest. The market merger 222 is further to merge the passive data and the BAM data of each zip code within the market of interest.

In the illustrated example of FIG. 2, the weight generator 214 further includes an example weight calculator 224 to calculate the weight(s) associated with each particular area within the market of interest. The weight calculator 224 calculates the weight(s) based on, in part, the assigned shares of the BAM data and the passive data. In some examples, the weight is calculated by a ratio of the passive data and the BAM data. In some examples, the weight may be calculated in a manner consistent with example equation 1:

$$\text{weight} = \frac{(\text{passive share}/\text{market total passive share})}{(\text{active share}/\text{market total active share})} \quad \text{Equation 1}$$

In the illustrated example of Equation 1, the "passive share" represents the number of passive data events occurring in a given zip code as determined by the share determiner 220, and the "market total passive share" represents the total number of passive data events occurring within the market of interest. Additionally, the "active share" represents the number of active data events occurring in a given zip code as determined by the share determiner 220, and the "market total active share" represents the total number of active data events occurring within the market of interest. Equation 1 utilizes the passive share and the active share assigned to each zip code in relation to the total share of the market for both the BAM data and the passive data.

The example weight generator 214 of FIG. 2 further includes an example weight adjuster 226 to adjust and/or verify the weight calculated by the weight calculator 224. In some examples, the weight adjuster 226 normalizes the weights to have a mean of one (e.g., by dividing each weight by a mean weight value). When the weight adjuster 226 has verified the weight, the weight may be used by the BAM calibrator 216 to calibrate the BAM data and remove the bias present in the BAM data.

To determine the share of the passive data assigned to each zip code, the example share determiner 220 of FIG. 2 includes an example market share analyzer 228, an example zip code selector 230, an example share comparator 232, an example share assignor 234, and an example zip code combiner 236.

The example market share analyzer 228 of FIG. 2 estimates a share of passive data events in each zip code as a percentage of the total number of passive data events occurring in the market of interest (e.g., Dallas, Tex.). When the share of passive data events has been estimated, the example market share analyzer 228 further calculates an estimated mean passive share of all of the zip codes in the selected market of interest. The example market share analyzer 228 additionally estimates a standard error of the passive shares of the zip codes in the selected market of interest.

In the illustrated example of FIG. 2, the zip code selector 230 of FIG. 2 selects a first zip code in the selected market of interest (e.g., Dallas, Tex.) to be assigned a passive share. The zip code selector 230 continues to select zip codes until each zip code within the market of interest has been selected and assigned a respective passive share. In other examples, the zip code selector 230 may instead select different particular areas within the market of interest (e.g., one or more cellular tower radius locations, counties, etc.).

The example share comparator 232 of FIG. 2 compares the passive share of the zip code selected by the example zip code selector 230 to the passive share estimated by the example market share analyzer 228. The example share comparator 232 outputs the result of the comparison to an example share assignor 234. The example share assignor 234 assigns a passive share to the zip code. In assigning the passive share to the zip code, the example share assignor 234 begins with the null hypothesis: an assumption that every zip code has a mean level of user activity and, therefore, should be assigned the mean weight. If a passive share of a zip code is within a particular value of the mean (e.g., a threshold value), the zip code is assumed to have the mean level of user activity (e.g., the zip code supports the null hypothesis) and is accordingly assigned the mean share. On the other hand, when the passive share of a zip code deviates from the mean share by a certain amount (e.g., more than a threshold value above or below the mean), the null hypothesis is violated, and the zip code must be weighted according to the passive share determined by the example market share analyzer 228.

When the example share comparator 232 determines that the passive share of the selected zip code satisfies (e.g., is greater than) a first threshold value above or below the mean passive share, the example share assignor 234 assigns the selected zip code its passive share (e.g., the percentage of data events occurring in the selected zip code). In some examples, the threshold value is one standard error (e.g., the standard error estimated by the market share analyzer 228). Additionally or alternatively, the first threshold value may be larger or smaller than one standard error. For example, if the estimated mean share is 7% (e.g., the average zip code within the market of interest includes 7% of the passive data events occurring within the market of interest) and the first threshold value (e.g., one standard error) is 1%, a passive share below 6% (e.g., one standard error below the mean) and above 8% (e.g., one standard error above the mean) would be considered more than the first threshold value above or below the mean passive share. Therefore, a zip code with a share of 9% will be assigned its market share (9%) because it is more than the first threshold value above the mean share, and a zip code having a passive share of 5% would be assigned its passive share (5%) because it is more than the first threshold value below the mean.

If, on the other hand, the passive share of the selected zip code is within the first threshold value above or below the mean, the share assignor 234 assigns the estimated mean passive share of market of interest to the selected zip code. In some examples, the first threshold value is one standard error (e.g., the standard error estimated by the market share analyzer 228). Additionally or alternatively, the first threshold value may be larger or smaller than one standard error. For example, taking the estimated mean share to be 7% and the first threshold value to be 1%, as above, a passive share between 6% (e.g., one standard error below the mean) and 8% (e.g., one standard error above the mean) would be considered less than the first threshold value above or below the mean passive share. Therefore, an example zip code having a share of 7.5% would be assigned the estimated mean share (7%) by the share assignor 234 because it falls within the first threshold value (e.g., 1%) of the mean passive share.

In some examples, the share comparator 232 determines that the passive share of the selected zip code is within a second threshold value of zero percent of the total market passive share (e.g., the total number of passive data events occurring in the market of interest). For example, if the second threshold value is 1% of the total market passive share, a selected zip code having a passive share of 0.05% is between 0% and 1% (e.g., the second threshold value) and is therefore determined to be within the second threshold value of zero percent of the total market passive share by the share comparator 232. In some examples, the second threshold value may be one standard error (e.g., the standard error estimated by the market share analyzer 228). Additionally or alternatively, the second threshold value may be larger or smaller than one standard error. In such an example, the share assignor 234 will assign the zip code to a pool of zip codes. The example share assignor 234 adds all of the zip codes in the selected market of interest within the second threshold value of zero percent of the total market share to the pool of zip codes to be combined by an example zip code combiner 236. The example zip code combiner 236 combines (e.g., by adding the passive shares) the zip code passive shares of each zip code selected by the example zip code selector 230 having a passive share within a second threshold value of zero percent of the total market share. The zip codes meeting this criteria (e.g., zip codes having a passive share within the second threshold value of zero percent of the total market share) are pooled together, for example, because they do not include enough data events alone to accurately determine a weight (e.g., the zip codes do not include enough data to be statistically significant).

The example zip code combiner 236 combines the passive shares of each respective zip code in the pool of zip codes. The pool of zip codes is then treated as a single entity and assigned a passive share by the example share assignor 234. In some examples, the share assignor 234 uses the same criteria to determine the passive share to be assigned to the pool of zip codes as was used on individual zip codes (e.g., a comparison to the first threshold value). For example, the pool of zip codes is assigned its passive share when the share comparator 232 determines that the passive share of the pool of zip codes is more than the first threshold above or below the mean passive share determined by the market share analyzer 228. In such an example, if the passive share of the pool of zip codes is within the first threshold value above or below the mean, the pool of zip codes is assigned the mean passive share by the share assignor 234. In some other examples, the share assignor 234 assigns the pool of zip codes its passive share (e.g., the combined passive share from the zip code combiner 236) without comparing the pool of zip codes to the mean passive share and the first threshold value.

The example share assignor 234 of FIG. 2 additionally determines a share of BAM data to be assigned to each zip code within a market of interest. In some examples, the share assignor 234 assigns a share of the BAM data to each zip code based on a number of active data events that occur within the zip code. In some such examples, the assigned share may be a percentage of the active data events in the market of interest that occur in each zip code.

When the example share assignor 234 of FIG. 2 has assigned a passive share to each zip code in the market of interest, the passive shares can be used by the example market merger 222 to combine with the BAM shares assigned by the example share assignor 234. The passive shares and the BAM shares are then used to calculate the weights for each zip code by the example weight calculator 224 and applied to the BAM data by the example BAM calibrator 216 to eliminate or reduce the biases in the BAM data, as described above.

In the illustrated example of FIG. 2, the data acquirer 208 implements a means for acquiring, the share assignor 234 implements a means for assigning, the weight calculator 224 implements a means for calculating, the BAM calibrator 216 implements a means for calibrating, the market share analyzer 228 implements a means for analyzing, the zip code combiner 236 implements a means for combining, the data cleaner 210 implements a means for cleaning, the provider data generator 218 implements a means for generating, the market merger 222 implements a means for merging, the weight adjuster 226 implements a means for adjusting, the zip code selector 230 implements a means for selecting, and the share comparator 232 implements a means for comparing.

While an example manner of implementing the data calibrator 201 is illustrated in FIG. 2, one or more of the elements, processes and/or devices illustrated in FIG. 2 may be combined, divided, re-arranged, omitted, eliminated and/or implemented in any other way. Further, the example data acquirer 208, the example data cleaner 210, the example weight generator 214, the example BAM calibrator 216, the examples provider data generator 218, the example share determiner 220, the example market merger 222, the example weight calculator 224, the example weight adjuster 226, the example market share analyzer 228, the example zip code selector 230, the example share comparator 232, the example share assignor 234, and the example zip code combiner 236 and/or, more generally, the example data calibrator 201 of FIG. 2 may be implemented by hardware, software, firmware and/or any combination of hardware, software and/or firmware. Thus, for example, any of the example data acquirer 208, the example data cleaner 20210, the example weight generator 214, the example BAM calibrator 216, the examples provider data generator 218, the example share determiner 220, the example market merger 222, the example weight calculator 224, the example weight adjuster 226, the example market share analyzer 228, the example zip code selector 230, the example share comparator 232, the example share assignor 234, and the example zip code combiner 236, and/or, more generally, the example data calibrator 201 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data acquirer 208, the example data cleaner 210, the example weight generator 214, the example BAM calibrator 216, the example provider data generator 218, the example share determiner 220, the example market merger 222, the example weight calculator 224, the example weight adjuster 226, the example market share analyzer 228, the example zip code selector 230, the example share comparator 232, the example share assignor 234, and the example zip code combiner 236 and/or, more generally, the example data calibrator 201 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data calibrator 201 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
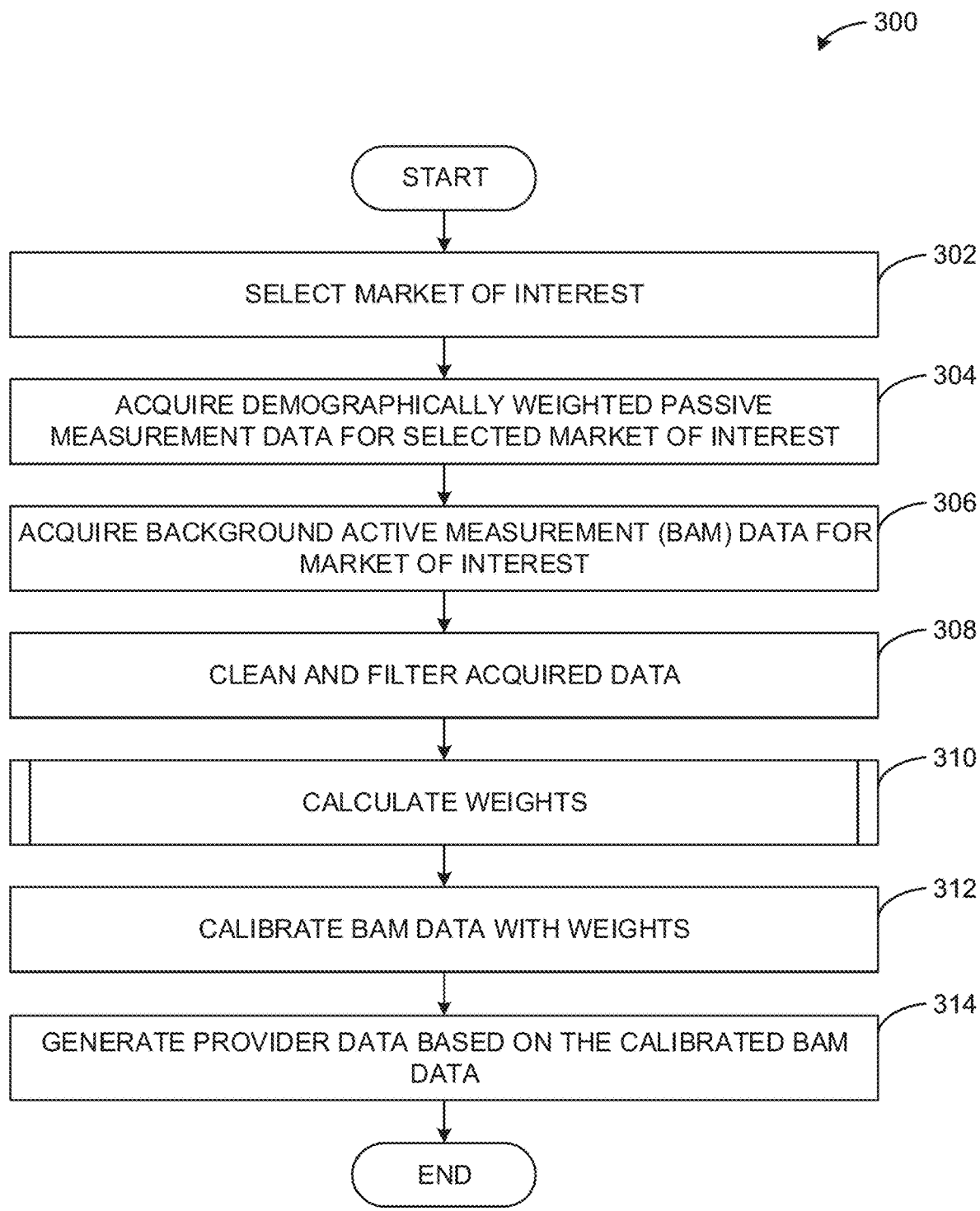
FIG. 3 is a flowchart representative of machine readable instructions which may be executed to implement the example data calibrator of FIG. 2.
Figure 4:
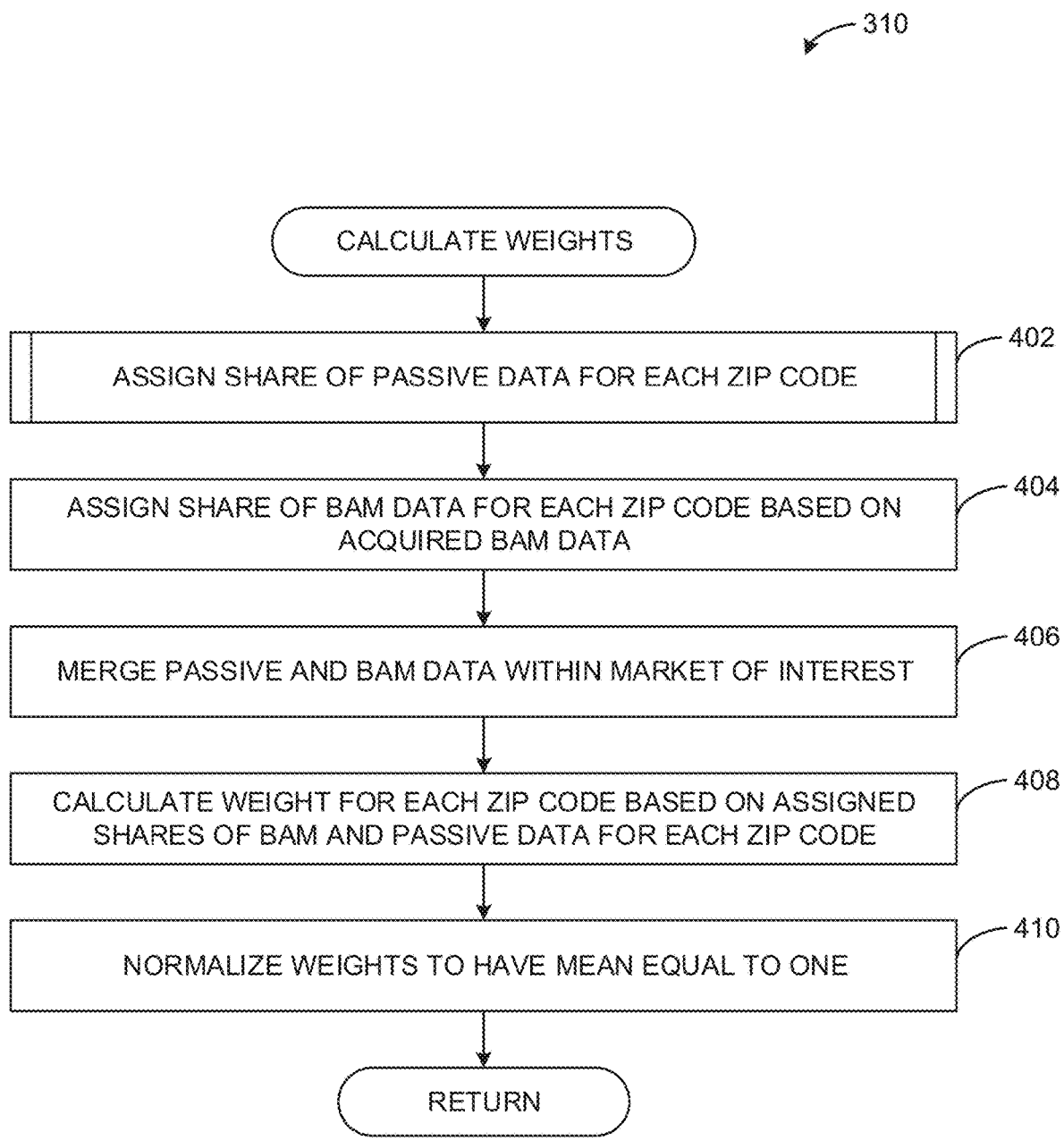
FIG. 4 is a flowchart representative of machine readable instructions which may be executed to implement the example weight generator of FIG. 2.
Figure 5:
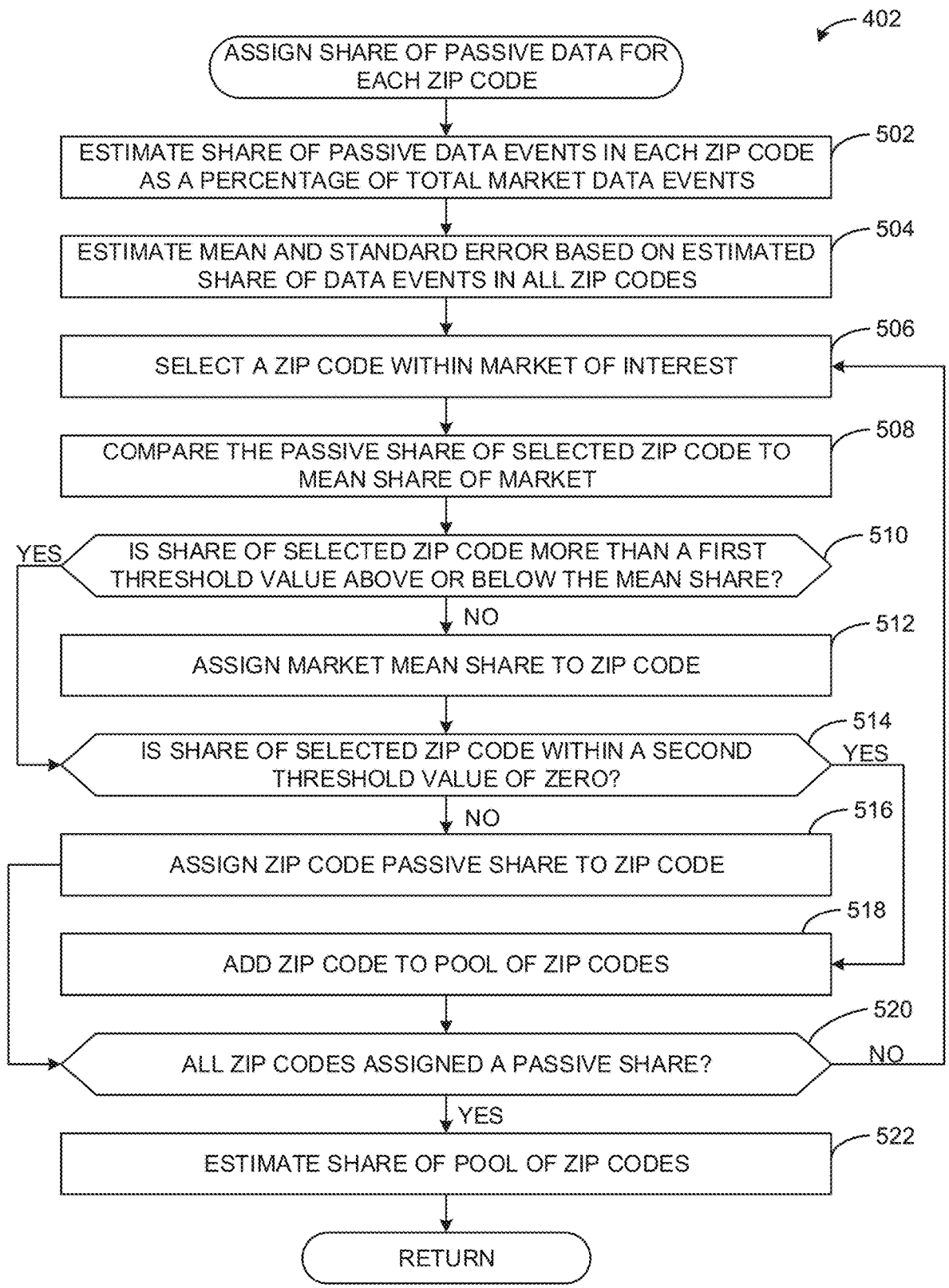
FIG. 5 is a flowchart representative of machine readable instructions which may be executed to implement the example share determiner of FIG. 2.

Flowcharts representative of example hardware logic, machine readable instructions, hardware implemented state machines, and/or any combination thereof for implementing the data calibrator 201 of FIG. 2 are shown in FIGS. 3-5. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-5, many other methods of implementing the example data calibrator 201 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is a flowchart representative of machine readable instructions which may be executed to implement the example data calibration system 200 and, in particular, the example data calibrator 201 of FIG. 2. The example program 300 begins at block 302 where the example data acquirer 208 selects a market of interest. In some examples, the market of interest is a metropolitan area of a major city (e.g., Los Angeles, Chicago, New York, etc.). In some examples, the market of interest may be one of the top 44 markets in the United States (e.g., the top 44 markets including the greatest number of panelists).

At block 304, the example data calibrator 201 acquires demographically weighted passive measurement data for the selected market of interest. In some examples, the data acquirer 208 acquires the passive measurement data from the example passive measurement data store 204 via the example network 202 of FIG. 2. At block 306, the data calibrator 201 acquires background active measurement (BAM) data for the market of interest. In some examples, the data acquirer 208 of the data calibrator 201 acquires the BAM data from the example BAM data store 206 via the network 202. For example, the data acquirer 208 is communicatively coupled to the passive measurement store 204 and the BAM store 206 via a network (e.g., the example network 202 of FIG. 2).

At block 308, the example data calibrator 201 cleans and filters the acquired data from the acquired demographically weighted passive measurement data (e.g., associated with block 304) and the acquired BAM data (e.g., associated with block 306). For example, the data cleaner 210 of the data calibrator 201 of FIG. 2 cleans and filters the passive data and the BAM data acquired by the data acquirer 208. In some examples, the data cleaner 210 receives the passive data and the BAM data from the data acquirer 208 via the bus 212. For example, the data cleaner 210 may discard any data events occurring prior to a specific time period (e.g., one month, one year, etc.). The data cleaner 20210 may also ensure the data acquired includes at least a set (e.g., a threshold) number of panelists for each provider (e.g., at least two panelists for a given provider) to ensure that a quantity of data is sufficient to satisfy best industry practices of statistical significance.

At block 310, the data calibrator 201 calculates weights. For example, the weight generator 214 of the data calibrator 201 of FIG. 2 calculates a weight for each zip code within the selected market of interest (e.g., particular zip codes within the Dallas, Tex. area shown in FIGS. 1A and 1B). In some examples, the weight generator 214 assigns shares of passive data and shares of BAM data corresponding to each zip code to calculate the weights for each zip code. A more detailed description of block 310 is shown in connection with FIG. 4, discussed in further detail below.

At block 312, the data calibrator 201 calibrates the BAM data with the weights calculated at block 310. For example, the example BAM calibrator 216 of the data calibrator 201 of FIG. 2 applies the weights calculated by the example weight generator 214 to the BAM data associated with each zip code.

At block 314, the data calibrator 201 generates provider data based on the calibrated BAM data. For example, the provider data generator 218 of the data calibrator 201 of FIG. 2 receives calibrated BAM data from the BAM calibrator 216 (e.g., via the example bus 212 of FIG. 2). The example provider data generator 218 calculates metrics indicating network performance within the market of interest for use by a provider. In some examples, the metrics include average video start time, video start success rate, and other metrics that may be desired by a network provider. In some examples, the provider data generated by the provider data generator 218 is displayed in a scorecard or other visual representation, such as the scorecard described in more detail in connection with FIG. 6. The provider data generated by the example provider data generator 218 represents information with reduced bias due to the calibration techniques disclosed herein. When the example provider data generator 218 generates provider data based on the calibrated BAM data, the program 300 of FIG. 3 concludes.

FIG. 4 is a flowchart representative of machine readable instructions which may be executed to implement the example weight generator 214 of FIG. 2 to calculate weights, as discussed above in connection with block 310. The example program 310 begins at block 402 where the weight generator 214 assigns shares of passive data for each zip code. For example, the share determiner 220 assigns a share of passive data to each zip code within the market of interest. A more detailed description of block 402 is shown in connection with FIG. 4, as discussed in further detail below.

At block 404, the example weight generator 214 assigns a share of BAM data for each zip code based on the acquired BAM data. For example, the share assignor 234 of FIG. 2 assigns a share of the BAM data to each zip code based on a number of active data events that occur within the zip code. In some such examples, the assigned share may be a percentage of the active data events in the market of interest that occur in each zip code.

At block 406, the example weight generator 214 merges the passive data and the BAM data within the market of interest. For example, the market merger 222 of FIG. 2 merges the passive data and the BAM data after the passive shares and the active shares have been assigned. At block 408, the example weight generator 214 calculates the weight of each zip code based on the assigned shares of BAM data and passive data for each zip code. For example, the weight calculator 224 of FIG. 2 receives the assigned shares of the passive data and the BAM data from the share determiner 220 (e.g., via the bus 212) and calculates the weight based on a ratio between the passive data and the BAM data. In some examples, the weight calculator 224 may use the following equation to calculate the weights in a manner consistent with example Equation 1, as described above. In such examples, the market total passive share is the total number of passive data events in a market of interest (e.g., Dallas, Tex.) and the market total active share is the number of active data events in the market of interest (e.g., Dallas, Tex.).

At block 410, the example weight generator 214 normalizes the weights to have a mean equal to one. For example, the weight adjuster 226 normalizes each weight calculated by the weight calculator 224 to make the mean of the weights equal to one to make comparisons between different markets possible (e.g., because all markets of interest are normalized to the same value (e.g., one)). In some examples, the weight adjuster 226 normalizes the weights by dividing each weight by the mean value of the weights in the market of interest. When the weights have been normalized by the example weight adjuster 226, the program 310 concludes.

FIG. 5 is a flowchart representative of machine readable instructions which may be executed to implement the example share determiner 220 of FIG. 2, and illustrates additional detail related to assigning a share of passive data for each zip code (block 302 of FIG. 3). The example program 402 of FIG. 5 begins at block 502 where the example share determiner 220 estimates a share of passive data events in each zip code as a percentage of total passive data events (e.g., the total quantity/number of passive data events occurring in the market of interest, such as the market of Dallas, Tex. shown in FIGS. 1A and 1B). For example, the market share analyzer 228 estimates a share of data events in each zip code as a percentage by dividing the number of data events associated with each zip code by the total number of data events in the market of interest.

At block 504, the example share determiner 220 estimates a mean and standard error based on the estimated share of data events in all zip codes. For example, the market share analyzer 228 estimates the mean of the estimated shares of the zip codes in the selected market of interest. The market share analyzer 228 further estimates the standard error of the estimated shares of the passive data for the zip codes in the market of interest.

At block 506, the example share determiner 220 selects a zip code within the market of interest. For example, the zip code selector 230 of FIG. 2 selects a zip code in the market of interest to be analyzed. At block 508, the share determiner 220 compares the passive share of the selected zip code to the mean share of the market. For example, the share comparator 232 of FIG. 2 compares the passive share of the zip code selected by the zip code selector 230 to the mean share of the market estimated by the market share analyzer 228.

At block 510, the share determiner 220 determines whether the share of the selected zip code is more than a first threshold value above or below the mean share. In some examples, the first threshold value is one standard error (e.g., the standard error estimated by the example market share analyzer 228). Additionally or alternatively, the first threshold value may be larger or smaller than one standard error. For example, the share assignor 234 may determine whether the passive share of the selected zip code is more than one standard error above or below the mean based on the comparison from the share comparator 232. If the passive share of the selected zip code is not more than one standard error above or below the mean share, control of the example program 402 proceeds to block 512. If the passive share of the selected zip code is more than the first threshold value above or below the mean share, control proceeds to block 514.

At block 512, the share determiner 220 assigns the mean share of the market to the selected zip code. For example, when the comparison from the share comparator 232 determines that the passive share is less than the first threshold value of above or below the mean share, the share assignor 234 of FIG. 2 assigns the mean share of the market to the selected zip code. For example, if the market share analyzer 228 determines that the mean passive share is 6.5% and the first threshold value (e.g., the standard error) is 1.5%, the share comparator 232 will determine that a passive share of the selected zip code that is between 5% and 8% is within the first threshold value (e.g., within one standard error) above or below the mean. Thus, the selected zip code will be assigned the mean passive share by the example share assignor 234 (e.g., instead of the passive share of the selected zip code).

At block 514, the share determiner 220 determines whether the passive share of the selected zip code is within a second threshold value of zero percent of the total market passive share (e.g., the total number of passive data events occurring in the market of interest). In some examples, the second threshold value is one standard error (e.g., the standard error estimated by the market share analyzer 228). Additionally or alternatively, the first threshold value may be larger or smaller than one standard error. For example, the market share analyzer 228 determines that the second threshold value (e.g., the standard error) is 1.5%, and the share comparator 232 determines whether the passive share is within 1.5% of zero percent of the total market share (e.g., between 0% and 1.5%). If the example share comparator 232 determines that the passive share is not within the second threshold value of zero percent of the total market share, control of the program 402 proceeds to block 516. If the example share comparator 232 determines that the passive share is within the second threshold value of zero percent of the total market share, control proceeds to block 518.

At block 516, the example share determiner 220 assigns the zip code passive share to the selected zip code. For example, the share assignor 234 assigns the selected zip code its passive share (e.g., the passive share calculated by the market share analyzer 228) when the share comparator 232 determines that the share is more than the first threshold value above or below the mean passive share and that the passive share is not within the second threshold value of zero. For example, the market share analyzer 228 may determine that the mean passive share is 6.5%, the standard error is 1.5%, and the passive share of the selected zip code is 3%. In such an example, if the first threshold value is set to be the standard error, the share comparator 232 determines that the passive share of the selected zip code is more than one standard error below the mean share (i.e., less than 5%) and not within one standard error of zero percent of the total market share (e.g., above 1.5%). In such an example, the share assignor 234 assigns the selected zip code its passive share (3%). Control of program 402 then proceeds to block 520.

At block 518, the share determiner 220 adds the selected zip code to a pool of zip codes. For example, if the share comparator 232 determines that the passive share of the zip code is within the second threshold value (e.g., the standard error) of zero, the zip code combiner 236 adds the selected zip code to a pool of zip codes. The example pool of zip codes combines the zip codes having passive shares that include too few data events to be assigned a share based on the passive share. The pool of zip codes may be treated as a single zip code to assign an adequate weight to zip codes having too few passive data events.

At block 520, the example share determiner 220 determines whether all zip codes in the market of interest have been assigned a passive share. For example, the zip code selector 230 determines whether each zip code in the market of interest has been selected by the zip code selector 230 and assigned a passive share by the share assignor 234. If the example zip code selector 230 determines that all zip codes have been assigned a passive share, control of the program 402 proceeds to block 522. If the example zip code selector 230 determines that there are remaining zip codes in the market of interest to be assigned a passive share, control returns to block 506, where the example zip code selector 230 selects a new zip code within the market of interest.

At block 522, the example share determiner 220 estimates a share for the pool of zip codes. For example, the zip code combiner 236 combines the shares of each respective zip code in the pool of zip codes. The pool of zip codes is then treated as a single entity and assigned a single share by the example share assignor 234. In some examples, the example share assignor 234 uses the same criteria to determine the passive share to be assigned to the pool of zip codes as was used for individual zip codes. For example, the pool of zip codes is assigned its passive share when the share comparator 232 determines that the collective passive share is more than the first threshold value above or below the mean passive share determined by the market share analyzer 228. In such an example, if the collective passive share of the pool of zip codes is within the first threshold value of the mean, the pool of zip codes is assigned the mean passive share by the share assignor 234. In some other examples, the share assignor 234 assigns the pool of zip codes its collective passive share without comparing the pool of zip codes to the mean passive share and the first threshold value (e.g., the standard error).

FIG. 6 is an example set of scorecards 600 created based on the calibrated BAM data generated by the data calibrator 201 of FIG. 2, illustrating the effect of weighting the BAM data by utilizing the methods discussed in detail above. For example, the BAM calibrator 216 of FIG. 2 may calibrate background active measurement (BAM) data as described in connection with FIGS. 2 and 3. Based on the resulting calibrated BAM data, the example provider data generator 218 of FIG. 2 may calculate provider information for one or more providers that is used to accurately describe the performance of the provider in a given market of interest.

The example set of scorecards 600 of FIG. 6 includes an example weighted scorecard 602 and an example unweighted provider scorecard 604. The unweighted scorecard 604 is not provided to the network providers using the methods disclosed herein and is displayed in FIG. 6 for illustrative purposes only. However, the unweighted results would have been provided to the network providers in previous methods, resulting in less accurate performance metrics that were calculated using the BAM data prior to calibration (e.g., before the example data calibrator 201 has removed the bias from the BAM data). The set of scorecards 600 therefore illustrates a comparison between the weighted scorecard 602 and the unweighted scorecard 604 to show the difference in the measurements with and without the bias.

In the illustrated example, the weighted scorecard 602 includes a market column 606 defining the market of interest (e.g., the market of interest determined by the example data acquirer 208 of FIG. 2). The market of interest in the example set of scorecards 600 is Chicago. In other examples, the market of interest may be any of the other markets of interest described in connection with FIGS. 2-5. In some examples, a scorecard such as the weighted scorecard 602 includes multiple markets of interest (e.g., Chicago, Los Angeles, and New York, etc.). Such information is useful in determining which markets of interest need additional development (e.g., increased network infrastructure), which markets are not in need of additional development, which markets of interest are performing most effectively, etc.

The weighted scorecard 602 further includes a metric column 608 to display a metric determined using the calibrated BAM data. For example, the scorecard may display information such as percent of tests with no rebuffering 608A and percent of time in HD 608B (e.g., the percent of time a sixty second video plays in high-definition). The metric column 608 additionally displays metrics such as percentage of time rebuffering, average video start time, video start success rate. In other examples, the metric column 608 may include any other metric calculated for a provider based on the BAM data.

An example value column 610 displays the numerical values (e.g., as percentages, decimals, integers, etc.) for each of a first provider 612 and a second provider 614. For example, the weighted scorecard 602 includes the metric for percent of tests with no rebuffering 608A in the metric column 608. Within the value column 610, the percentage of the tests conducted with no rebuffering is displayed as a percentage (e.g., 72.6% for the first provider 612) for the metric. A value is given for each metric in the metric column 608 and each provider (e.g., the first provider 612 and the second provider 614). In some examples, the weighted scorecard 602 includes only one provider (e.g., only the first provider 612). In other examples, the weighted scorecard 602 includes more than two providers.

The weighted scorecard 602 further includes a margin of error column 616 to display a margin of error for each metric in the metric column 608. For example, the margin of error for the first provider 612 for the percentage of time rebuffering metric is 1.2%. In some examples, the margin of error in the margin of error column 616 can be used to determine a confidence interval for a given value in the value column 610.

The example weighted scorecard 602 further includes a rank column 618 to determine a rank of each provider relative to other providers. In the illustrated example, a ranking 620 of one was given to the second provider 614 for the percent of time rebuffering metric. The ranking 620 indicates that the provider is ranked higher than competitors for the given metric (e.g., percent of time rebuffering). In another example, a ranking of three or four would indicate that the provider is ranked lower than other competitors for the given metric. In the illustrated example, multiple providers may receive the same ranking. For example, when the rankings are substantially similar (e.g., within a threshold value of one another), the same rank may be assigned to each provider. In some alternative examples, the rank column 618 includes a unique ranking for each provider. For example, if four providers were being ranked, each would receive a rank of one through four with no providers receiving the same rank.

In the illustrated example of FIG. 6, the weighted scorecard 602 includes a weighted entry 622 for the percent of tests with no rebuffering metric 608A. The weighted entry 622 is a value displayed as a percentage. An unweighted entry 624 is shown in the unweighted scorecard 604. The weighted entry 622 and the unweighted entry 624 correspond to the same market of interest (Chicago), metric (the percent of tests with no rebuffering metric 608A), and provider (the first provider 612). The weighted entry 622 and the unweighted entry 624 illustrate the effect of the BAM data calibration, as the weighted entry 622 corresponding to the weighted scorecard 602 (e.g., the calibrated BAM data) is 1.4% lower than the unweighted entry 624 corresponding to the unweighted scorecard 604 (e.g., the uncalibrated BAM data). The difference between the weighted entry 622 and the unweighted entry 624 represents the bias inherent in the acquired BAM data. By calibrating the BAM data, as described in connection with FIGS. 2-5, this bias is eliminated or reduced, and the weighted scorecard 602 displays more accurate results than the unweighted scorecard 604. Because providers use the BAM data to allocate spending on major infrastructure projects, for example, the accuracy and precision of the BAM data are of extremely high value to providers. Inaccurate results can result in incorrect overspending in markets where it is not needed or underspending in markets where it is needed, thus greatly hindering the improvements to the cellular networks that providers desire to make.

The example set of scorecards 600 includes other entries illustrating the differences between the weighted scorecard 602 and the unweighted scorecard 604. Differences exist between entries in values associated with other metrics, values associated with either the first provider 612 or the second provider 614, margin of error entries, and rankings in the rank column 618. Such differences indicate the effect the bias inherent in the BAM data and the effect of weighting the BAM data using the methods disclosed herein.

Figure 7:
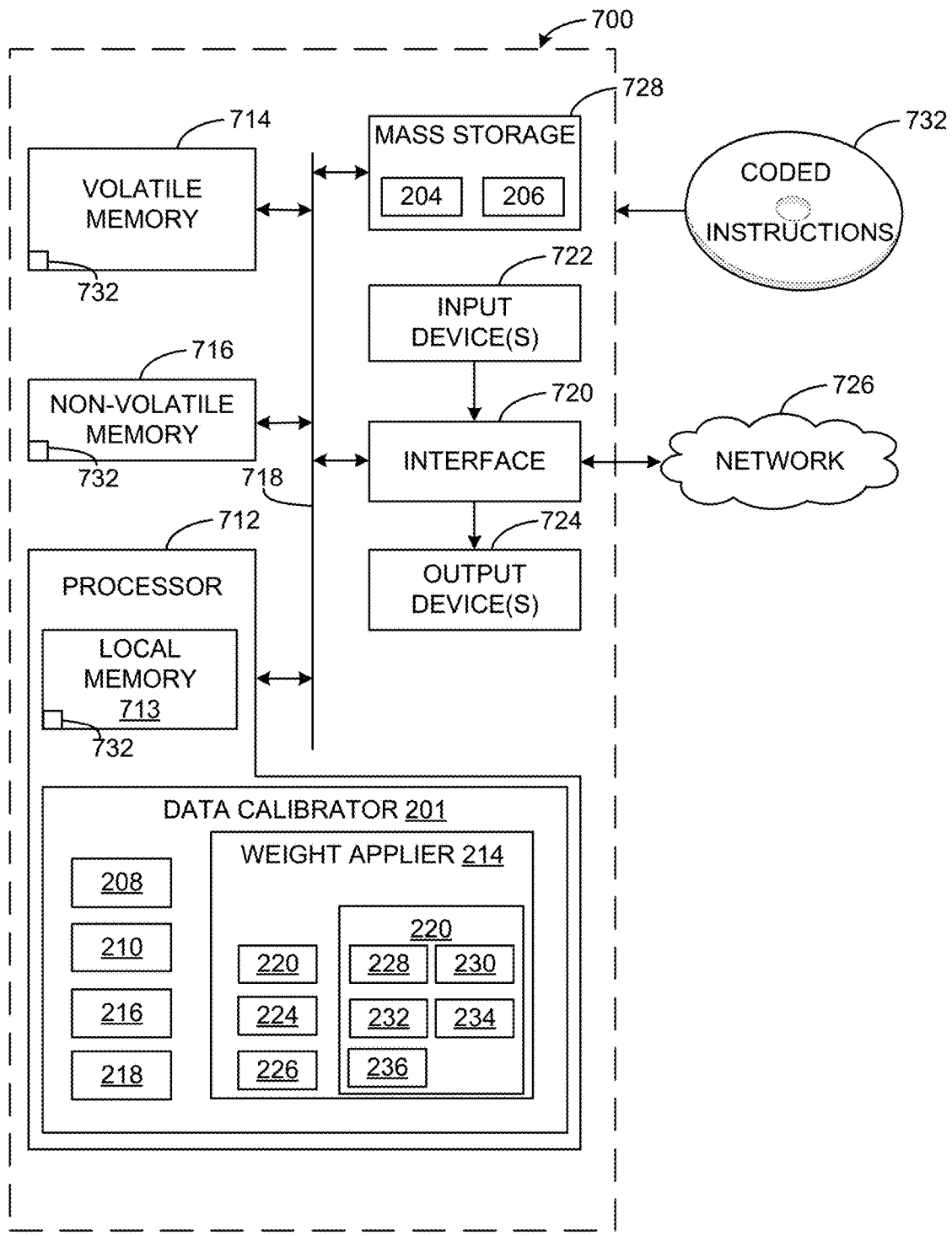
FIG. 7 is a block diagram of an example processing platform structured to execute the instructions of FIGS. 3-5 to implement the example data calibrator 201.

FIG. 7 is a block diagram of an example processor platform 700 structured to execute the instructions of FIGS. 3-5 to implement the data calibrator 201 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data calibrator 201, the example data acquirer 208, the example data cleaner 210, the example weight generator 214, the example BAM calibrator 216, the example share determiner 220, the example market merger 222, the example weight calculator 224, the example weight adjuster 226, the example market share analyzer 228, the example zip code selector 230, the example share comparator 232, the example share assignor 234 and the example zip code combiner 236 of FIG. 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In the illustrated example, the mass storage devices 728 include the example passive measurement data store 204 and the example background active measurement (BAM) data store 206.

The machine executable instructions 732 of FIGS. 2-4 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that calibrate payload information. In examples disclosed herein, bias associated with background active measurement (BAM) testing of devices in a cellular network are eliminated or reduced by calibrating the BAM testing results with passively collected data. In some examples, the calibration of BAM data results in more accurate measurements provided to network providers. Further, some examples produce information that providers may use to allocate spending for infrastructure in markets or locations that have the most need of improvement. The accuracy and precision of the BAM data are of extremely high value to providers, and the methods disclosed herein provide results that prevent incorrect over-spending in markets where it is not needed or under-spending in markets where it is needed. Thus, examples disclosed herein allow providers to make the improvements to their cellular networks that provide the greatest benefit to their customers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   at least one memory;
   instructions in the apparatus; and
   processor circuitry to execute the instructions to:
   obtain (a) passive measurement data and (b) background active measurement (BAM) data from panelists in a market of interest, the BAM data associated with network usage metrics of panelist wireless devices undisturbed by panelist behavior;
   assign a first share of the passive measurement data and a second share of the BAM data to particular areas within the market of interest, the first share based on a number of passive measurement occurrences in a first one of the particular areas, the second share based on a number of BAM occurrences in the first one of the particular areas; and
   remove a bias between the passive measurement data and the BAM data by calibrating the BAM data for the market of interest using weights determined for the first one of the particular areas based on the first and second shares.

2. The apparatus of claim 1, wherein the particular areas are zip codes within the market of interest.

3. The apparatus of claim 1, wherein the processor circuitry is to execute the instructions to:
   calculate a mean of the number of passive measurement occurrences within the particular areas of the market of interest; and
   assign the first share of the passive measurement data to the first one of the particular areas based on a comparison between the number of passive measurement occurrences in the first one of the particular areas and the mean of the number of passive measurement occurrences.

4. The apparatus of claim 3, wherein the processor circuitry is to execute the instructions to assign the mean of the number of passive measurement occurrences to the first one of the particular areas when the number of passive measurement occurrences in the first one of the particular areas is within a first threshold value above or below the mean.

5. The apparatus of claim 4, wherein the first threshold value is a standard error of the number of passive measurement occurrences within the particular areas.

6. The apparatus of claim 4, wherein the processor circuitry is to execute the instructions to combine the number of passive measurement occurrences of the first one of the particular areas with a number of passive measurement occurrences of a second one of the particular areas when the number of passive measurement occurrences of the first and second ones of the particular areas are within a second threshold value of zero passive measurement occurrences.

7. The apparatus of claim 6, wherein the second threshold value is a standard error of the number of passive measurement occurrences within the particular areas.

8. A non-transitory computer readable storage medium comprising instructions that, when executed, cause a machine to at least:
   obtain (a) passive measurement data and (b) background active measurement (BAM) data from panelists in a market of interest, the BAM data associated with network usage metrics of panelist wireless devices undisturbed by panelist behavior;
   assign a first share of the passive measurement data and a second share of the BAM data to particular areas within the market of interest, the first share based on a number of passive measurement occurrences in a first one of the particular areas, the second share based on a number of BAM occurrences in the first one of the particular areas; and
   remove a bias between the passive measurement data and the BAM data by calibrating the BAM data for the market of interest using weights determined for the first one of the particular areas based on the first and second shares.

9. The non-transitory computer readable storage medium as defined in claim 8, wherein the particular areas are zip codes within the market of interest.

10. The non-transitory computer readable storage medium as defined in claim 8, wherein the instructions further cause the machine to:
    calculate a mean of the number of passive measurement occurrences within the particular areas of the market of interest; and
    assign the first share of the passive measurement data to the first one of the particular areas based on a comparison between the number of passive measurement occurrences in the first one of the particular areas and the mean of the number of passive measurement occurrences.

11. The non-transitory computer readable storage medium as defined in claim 10, wherein the instructions further cause the machine to assign the mean of the number of passive measurement occurrences to the first one pf the particular areas when the number of passive measurement occurrences in the first one of the particular areas is within a first threshold value above or below the mean.

12. The non-transitory computer readable storage medium as defined in claim 11, wherein the first threshold value is a standard error of the number of passive measurement occurrences within the particular areas.

13. The non-transitory computer readable storage medium as defined in claim 11, wherein the instructions further cause the machine to combine the number of passive measurement occurrences of the first one of the particular areas with a number of passive measurement occurrences of a second one of the particular areas when the number of passive measurement occurrences of the first and second ones of the particular areas are within a second threshold value of zero passive measurement occurrences.

14. The non-transitory computer readable storage medium as defined in claim 13, wherein the second threshold value is a standard error of the number of passive measurement occurrences within the particular areas.

15. A method comprising:
obtaining, by executing one or more instructions with processor circuitry, (a) passive measurement data and (b) background active measurement (BAM) data from panelists in a market of interest, the BAM data associated with network usage metrics of panelist wireless devices undisturbed by panelist behavior;
assigning, by executing one or more instructions with the processor circuitry, a first share of the passive measurement data and a second share of the BAM data to particular areas within the market of interest, the first share based on a number of passive measurement occurrences in a first one of the particular areas, the second share based on a number of BAM occurrences in the first one of the particular areas; and
removing, by executing one or more instructions with the processor circuitry, a bias between the passive measurement data and the BAM data by calibrating the BAM data for the market of interest using weights determined for the first one of the particular areas based on the first and second shares.

16. The method as defined in claim 15, wherein the particular areas are zip codes within the market of interest.

17. The method as defined in claim 15, further including:
calculating, by executing one or more instructions with the processor circuitry, a mean of the number of passive measurement occurrences within the particular areas of the market of interest; and
assigning, by executing one or more instructions with the processor circuitry, the first share of the passive measurement data to the first one of the particular areas based on a comparison between the number of passive measurement occurrences in the first one of the particular areas and the mean of the number of passive measurement occurrences.

18. The method as defined in claim 17, further including assigning, by executing one or more instructions with the processor circuitry, the mean of the number of passive measurement occurrences to the first one of the particular areas when the number of passive measurement occurrences in the first one of the particular areas is within a first threshold value above or below the mean.

19. The method as defined in claim 18, wherein the first threshold value is a standard error of the number of passive measurement occurrences within the particular areas.

20. The method as defined in claim 18, further including combining, by executing one or more instructions with the processor circuitry, the number of passive measurement occurrences of the first one of the particular areas with a number of passive measurement occurrences of a second one of the particular areas when the number of passive measurement occurrences of the first and second ones of the particular areas are within a second threshold value of zero passive measurement occurrences.

* * * * *